March 24, 1931. A. B. BEITMAN 1,797,396
WINDSHIELD OPERATING MECHANISM
Filed Aug. 29, 1927 2 Sheets-Sheet 1
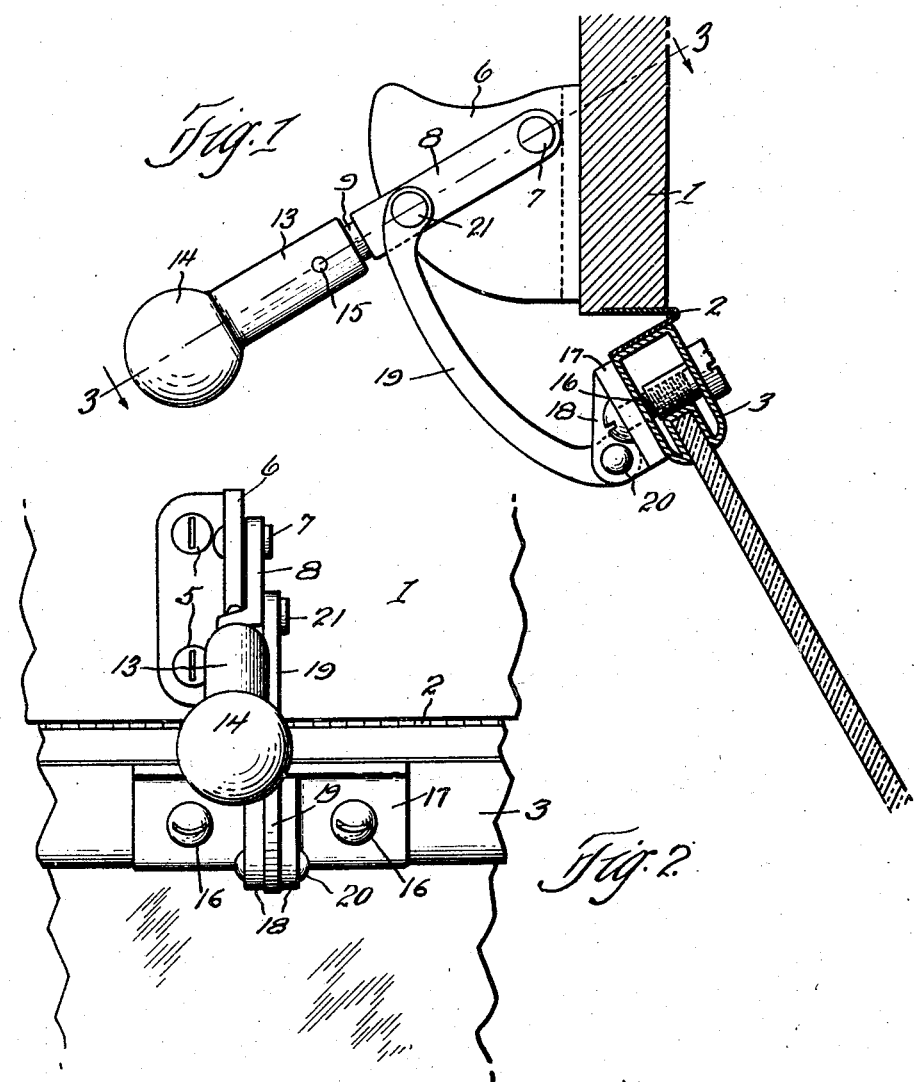
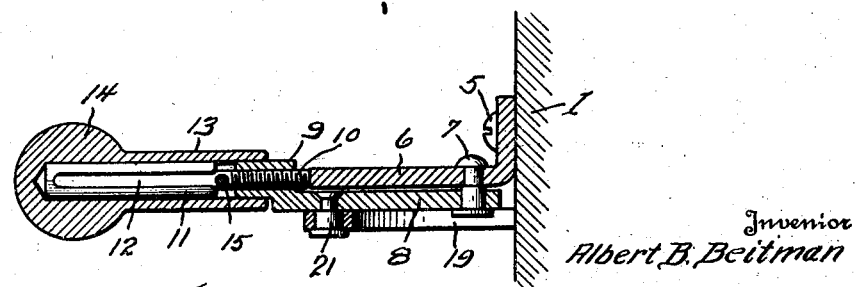
Inventor
Albert B. Beitman
By Hull, Brock & West
Attorneys March 24, 1931.  A. B. BEITMAN  1,797,396
WINDSHIELD OPERATING MECHANISM
Filed Aug. 29, 1927  2 Sheets-Sheet 2
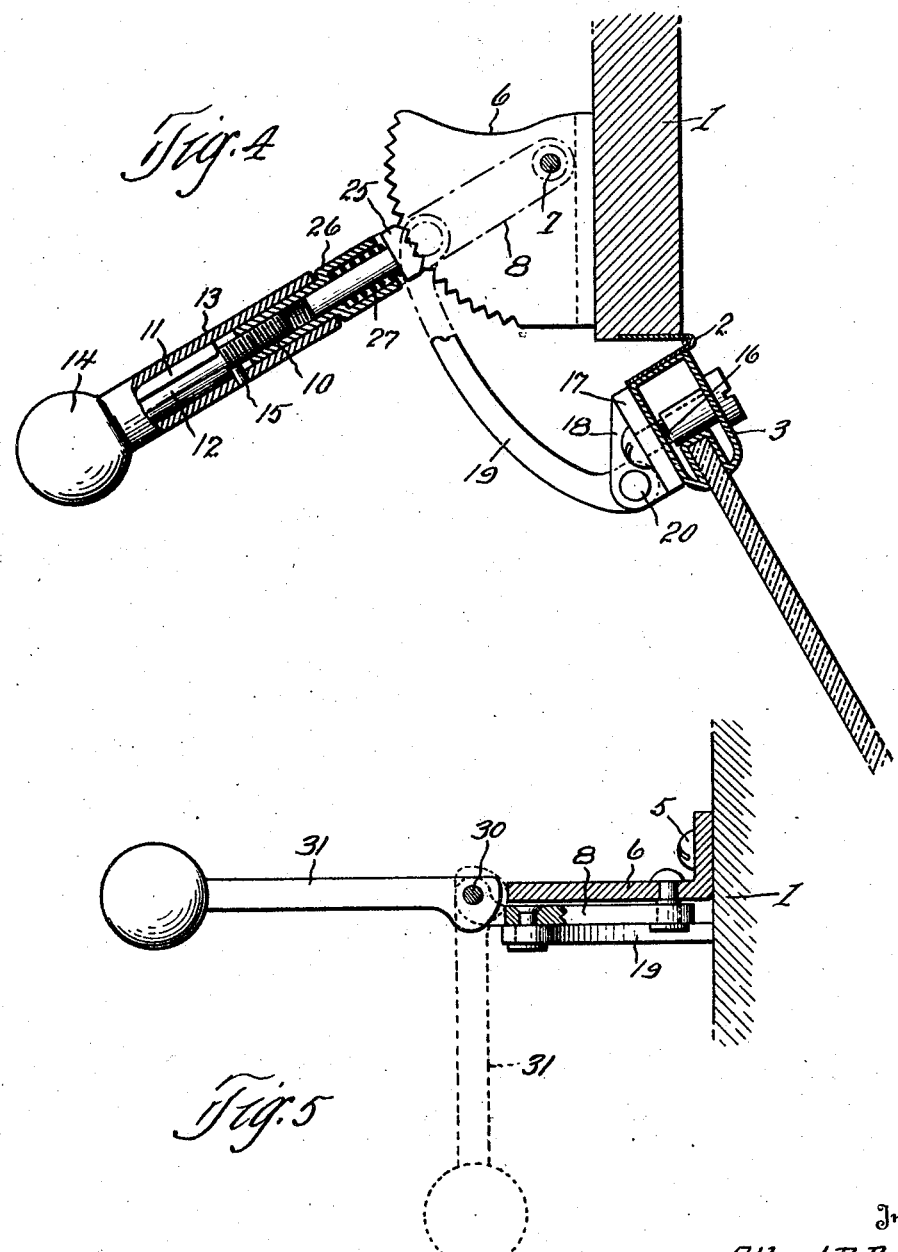
Inventor
Albert B. Beitman
By Hull, Brock & West
Attorney Patented Mar. 24, 1931

1,797,396

UNITED STATES PATENT OFFICE

ALBERT B. BEITMAN, OF CLEVELAND HEIGHTS, OHIO

WINDSHIELD-OPERATING MECHANISM

Application filed August 29, 1927. Serial No. 216,212.

This invention relates to windshield operating mechanism and it has for its objects to provide a simple and relatively inexpensive device of this character that may be easily and quickly installed in either new or used cars and conveniently operated with one hand to instantly swing the windshield sash to any desired position within a wide range of adjustment and lock it securely in such position. The device serves also to hold the sash tightly closed. A further object is to provide an extensible operating handle for the mechanism whereby the leverage may be increased and the operation thus rendered easier and which enables the handle to be contracted or folded back out of the way when not in use.

Embodiments of the invention through which the foregoing objects are attained are illustrated in the accompanying drawings wherein Fig. 1 is a side elevation of the device applied to a windshield, parts of the frame and cash of the windshield being shown in section; Fig. 2 is an elevational view taken as though looking from the left to Fig. 1; Fig. 3 is a sectional detail on the line 3—3 of Fig. 1; Fig. 4 is a sectional side elevation of a modified form of the invention; and Fig. 5 is a plan view of a further modification.

Describing the parts by reference characters, 1 represents the top member of the windshield frame to the lower edge of which is connected, by the usual so-called "piano" hinge 2, a windshield sash 3.

Fastened as by screws 5 to the inner side of the frame member 1 is a bracket 6 to which is pivoted at 7 a lever 8. The rear edge of the bracket 6 is curved on an arc concentric with the axis of the pivot 7, and the free end of the lever 8 overhangs the curved edge of the bracket, as best illustrated in Fig. 3, and terminates in a boss 9 which has an axial, threaded bore. Operating within this bore is a screw 10 that is shown as provided with an elongated cylindrical head 11 that has a longitudinal groove 12 along one side that stops short of the outer end of the head. Telescoping over the head of the screw is a sleeve 13 that incorporates an operating handle 14, shown as spherical in form. An inwardly projecting pin 15 is carried by the sleeve 13 and normally this pin is in advance of the open end of the slot 12 so that the handle may be turned to dispose the pin out of register with the slot 7; but when it is desired to extend the handle the latter is rotated until the pin is in alignment with the slot 12 when it is free to enter the slot and thus permit the sleeve 13 to slide outwardly along the head 11 until such movement is arrested by the engagement of said pin with the closed end of the slot. When the pin is in the slot it constitutes a driving connection between the operating handle and the screw so that the screw may be turned by means of the handle. The inner end of the screw is arranged to engage the curved edge of the bracket 6 and by turning the screw inwardly against the bracket the lever 8 may be locked in any position to which it is adjusted.

Secured by suitable fastening means, such as bolts 16, to the top of the sash 3, is a fitting 17. This fitting has laterally spaced ears 18 between which the lower end of a link 19 is disposed, and a pin or rivet 20 is engaged through registering apertures of the ears 18 and link 19, thereby to pivotally connect the parts together. The opposite end of the link is pivoted at 21 to the lever 8.

When it is desired to adjust the windshield sash, the operator grasps the handle 14 and rotates it until he feels the pin 15 enter the slot 12 of the screw head 11. He then slides the handle outwardly along said head, thereby to increase the effective length of the lever 8, and rotates the operating handle to retract the screw 10 so as to withdraw the screw from binding engagement with the bracket 6. With the parts in this condition, the operator may swing the handle so as to adjust the windshield sash to any desired position through the intervention of the link 19. When the desired adjustment of the sash has been attained he turns the operating handle in a direction to advance the screw and cause it to bind against the curved edge of the bracket and thus lock the parts in their newly acquired position. The handle may now be shoved inwardly along the screw until the pin 15 leaves the slot 12 and by turning the handle so as to move the pin out of line with the slot the handle is prevented from sliding outwardly on the head of the screw. Obviously by raising the lever 8 to its extreme upper position and locking it by means of the screw 10, the sash may be secured in closed position.

In the form of the invention illustrated in Fig. 4, the curved edge of the bracket 6 is formed with teeth wherewith the toothed edge of a member 25 cooperates, said member being in the nature of a plunger that is guided within an elongated boss 26 of the lever 8. Said boss is counterbored to accommodate a spring 27 which serves to advance the member toward the bracket. In the present case, the screw 10 is adapted to be extended forwardly by the operating handle 14 so as to positively prevent retraction of the member 25.

In the operation of this form of the invention, when the screw 10 is retracted, the lever 8 may be swung on its pivot 7 to effect the desired adjustment of the sash 3, the member 25 riding over the teeth of the bracket during such operation, and by reason of the nature of the engagement of the member with the bracket the parts are held in position against ordinary forces tending to swing the windshield sash to closed position; and the parts may be positively locked by advancing the screw 10 so as to prevent retraction of the member 25.

In the modification of Fig. 5, the bracket 6 may be the same as that shown in Figs. 1 to 3, and the outer end of the lever 8 is bifurcated and extends laterally in opposed relation to the curved edge of the bracket. Within the bifurcated end of the lever 8 is pivoted, on a pin 30, the inner end of an operating handle 31, said inner end being in the nature of a cam, which, when the operating handle is swung to the dotted line position in Fig. 5, binds against the edge of the bracket.

In this case when it is desired to adjust the windshield sash the operating handle 31 is swung into approximate alignment with the lever 8 and through it the lever is adjusted so as to effect the desired adjustment of the sash and when this condition is reached the handle is swung to the side so as to cause its cam to engage the edge of the bracket and lock the parts against movement.

Having thus described my invention, what I claim is:

1. In combination with a frame and a relatively movable windshield sash, a lever, a pivotal support therefor fixed with respect to the frame, operative connections between the lever and the sash whereby the latter may be adjusted by a swinging of the lever on its pivot, a member that is stationary with respect to the pivotal support, a screw carried by the lever for engaging with said member for holding the lever in any position to which it is adjusted, and an operating handle carried by and extensible with respect to the lever for swinging the lever and for adjusting said screw.

2. In combination with a frame and a relatively movable windshield sash, a lever, a pivotal support therefor fixed with respect to the frame, operative connections between the lever and the sash whereby the latter may be adjusted by a swinging of the lever on its pivot, a member that is stationary with respect to the pivotal support, a screw carried by the lever for engaging with said member for holding the lever in any position to which it is adjusted, and an operating handle telescoping over the head of the screw for swinging the lever on its pivot and for turning the screw.

3. In combination with a frame and a relatively movable windshield sash, a lever, a pivotal support therefor fixed with respect to the frame, operative connections between the lever and the sash whereby the latter may be adjusted by the swinging of the lever on its pivot, a member that is stationary with respect to the pivotal support, a screw member carried by the lever for engaging with said member for holding the lever in any position to which it is adjusted and an operating handle member telescoping over the head of the screw for swinging the lever on its pivot and for turning the screw, one of the two last mentioned members having a slot extending longitudinally thereof, the other of said members having a pin adapted to enter said slot in one position of the rotation of the handle member, and adapted to be disengaged from said slot and hold the handle in its retracted position.

4. In a device of the character described, a frame, a windshield sash pivoted thereto, an arcuate member carried by said frame, a lever pivoted centrally of the arc of said arcuate member, a link pivoted to said lever at one end and to said sash at the other, said lever having a portion provided with a threaded bore in alignment with the face of said arcuate member, a screw received in said threaded bore and having an enlarged, elongated head provided with a longitudinal groove, a handle member telescoping said head and having a projection therein adapted to cooperate with said groove whereby said handle may be rotated to cause said screw to engage said arcuate member or to be withdrawn therefrom and may be extended for increasing or decreasing the leverage at will.

5. In a device of the character described, a frame, a windshield sash pivoted thereto, an arcuate member carried by said frame, a lever pivoted centrally of the arc of said arcuate member, a link pivoted to said lever at one end and to said sash at the other, said lever having a portion provided with a threaded bore in alignment with the face of said arcuate member, a screw received in said threaded bore and having an enlarged, elongated head provided with a longitudinal groove, a handle member telescoping said head and having a projection therein adapted to cooperate with said groove whereby said handle may be rotated to cause said screw to engage said arcuate member or to be withdrawn therefrom and may be extended for increasing or decreasing the leverage at will, said longitudinal groove being open at the end of the head adjacent the threaded portion and terminating short of the other end to prevent the handle member from being completely removed.

6. In a device of the character described, an arcuate member, a lever pivoted centrally of the arc of said arcuate member, said lever having a portion provided with a threaded bore in alignment with the face of said arcuate member, a screw received in said threaded bore and having an enlarged, elongated head provided with a longitudinal groove, a handle member telescoping said head and having a projection therein adapted to cooperate with said groove whereby said handle may be rotated to cause said screw to engage said arcuate member or to be withdrawn therefrom and may be extended for increasing or decreasing the leverage at will.

7. In a device of the character described, a frame, a windshield sash pivoted thereto, an arcuate member carried by said frame, a lever pivoted centrally of the arc of said arcuate member, a link pivoted to said lever at one end and to said sash at the other, said lever having a portion provided with a threaded bore in alignment with the face of said arcuate member, a screw received in said threaded bore and having an enlarged, elongated head provided with a longitudinal groove, a handle member telescoping said head and having a projection therein adapted to cooperate with said groove whereby said handle may be rotated to cause said screw to engage said arcuate member or to be withdrawn therefrom and may be extended for increasing or decreasing the leverage at will, said handle member being provided with an internal bore extending less than the full length thereof and said projection being spaced from the end of said bore a distance slightly greater than the length of said head.

8. In a device of the character described, an arcuate member, a lever pivoted centrally of the arc of said arcuate member, said lever having a portion provided with a threaded bore in alignment with the face of said arcuate member, a screw received in said threaded bore and having an enlarged, elongated head provided with a longitudinal groove, a handle member telescoping said head and having a projection therein adapted to cooperate with said groove whereby said handle may be rotated to cause said screw to engage said arcuate member or to be withdrawn therefrom and may be extended for increasing or decreasing the leverage at will, said handle member being provided with an internal bore extending less than the full length thereof and said projection being spaced from the end of said bore a distance slightly greater than the length of said head.

In testimony whereof, I hereunto affix my signature.

ALBERT B. BEITMAN.